United States Patent
Ou et al.

(10) Patent No.: US 10,404,528 B2
(45) Date of Patent: Sep. 3, 2019

(54) IMAGE FORMING APPARATUS AND SYSTEM

(71) Applicant: Zhuhai Seine Technology CO., Ltd., Zhuhai (CN)

(72) Inventors: Jianqing Ou, Zhuhai (CN); Xuan Tan, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 0 days.

(21) Appl. No.: 15/921,393

(22) Filed: Mar. 14, 2018

(65) Prior Publication Data

US 2018/0270106 A1  Sep. 20, 2018

(30) Foreign Application Priority Data

Mar. 15, 2017  (CN) .......................... 2017 1 0154274
Mar. 15, 2017  (CN) ..................... 2017 2 0252476 U (51) Int. Cl.
| | |
|---|---|
| *G06K 15/00* | (2006.01) |
| *H04L 12/24* | (2006.01) |
| *G06F 3/12* | (2006.01) |
| *H04N 1/00* | (2006.01) |
| *H04N 1/32* | (2006.01) |

(52) U.S. Cl.
CPC ........ *H04L 41/0681* (2013.01); *G06F 3/1203* (2013.01); *G06F 3/129* (2013.01);
(Continued)

(58) Field of Classification Search
CPC ........................... H04L 41/0681; H04L 41/14; H04N 1/00204; H04N 1/00244; G06F 3/1203;G06F 3/1222; G06F 3/1231; G06F 3/1236; G06F 3/1237; G06F 3/1238; G06F 3/1239; G06F 3/129; G06F 3/1285
See application file for complete search history.

(56) References Cited

U.S. PATENT DOCUMENTS

| | | | |
|---|---|---|---|
| 2008/0130042 A1 | 6/2008 | Iizuka et al. | |
| 2009/0015867 A1* | 1/2009 | Ukegawa | G06F 8/65 358/1.16 |

(Continued)

FOREIGN PATENT DOCUMENTS

| | | | |
|---|---|---|---|
| EP | 1330100 A2 | 7/2003 | |
| EP | 1330100 A3 | 11/2004 | |

(Continued)

OTHER PUBLICATIONS

The European Patent Office (EPO) The Extended European Search Report for 18161036.1 dated Aug. 3, 2018 9 Pages.

*Primary Examiner* — Moustapha Diaby
(74) *Attorney, Agent, or Firm* — Anova Law Group, PLLC (57) ABSTRACT

An image forming device is provided. The image forming device includes a network port for accessing a specific network through a network server; and a network monitoring device. The network monitoring device includes: a data acquirer configured to connect with the network port and to output network data of the network port; a data analyzer connected with the data acquirer and configured to analyze the network data to determine whether the network data transmitted from the data acquirer contains information indicating that the image forming device is connected to the specific network; and an alert message transmitter connected with the data analyzer and configured to, when the data analyzer determines that the network data contains information indicating that the image forming device is connected to the specific network, send an alert message to a user of the image forming device.

16 Claims, 3 Drawing Sheets

(52) U.S. Cl.
CPC .......... *G06F 3/1222* (2013.01); *G06F 3/1231* (2013.01); *G06F 3/1236* (2013.01); *G06F 3/1238* (2013.01); *G06F 3/1285* (2013.01); *H04L 41/14* (2013.01); *H04N 1/00204* (2013.01); *H04N 1/00244* (2013.01); *H04N 1/00323* (2013.01); *G06F 3/1237* (2013.01); *G06F 3/1239* (2013.01); *H04N 1/00026* (2013.01); *H04N 1/00344* (2013.01); *H04N 1/32* (2013.01)

(56) References Cited

U.S. PATENT DOCUMENTS

| | | | |
|---|---|---|---|
| 2010/0235883 A1* | 9/2010 | Sato | H04N 1/00408 726/3 |
| 2011/0102836 A1* | 5/2011 | Kawaura | G06F 3/1204 358/1.15 |
| 2011/0235085 A1 | 9/2011 | Jazayeri et al. | |
| 2012/0250066 A1 | 10/2012 | Kikumoto et al. | |
| 2013/0321850 A1* | 12/2013 | Tsuji | G06K 15/4095 358/1.14 |
| 2014/0240753 A1 | 8/2014 | Anno et al. | |
| 2014/0320888 A1 | 10/2014 | Baek et al. | |
| 2016/0019013 A1* | 1/2016 | Ido | G06F 3/1286 358/1.15 |
| 2016/0337393 A1* | 11/2016 | Tsuchitoi | H04L 63/1433 |

FOREIGN PATENT DOCUMENTS

| | | |
|---|---|---|
| EP | 2587363 A2 | 5/2013 |
| EP | 2587363 A3 | 4/2014 |
| RU | 2349953 C2 | 3/2009 |
| WO | 2011115987 A2 | 9/2011 |

\* cited by examiner

IMAGE FORMING APPARATUS AND SYSTEM

CROSS-REFERENCES TO RELATED APPLICATIONS

This application claims priority to Chinese Patent Application No. CN201710154274.X, filed on Mar. 15, 2017, and Chinese Patent Application No. CN201720252476.3, filed on Mar. 15, 2017, both of which are incorporated by reference in entirety.

FIELD OF THE TECHNOLOGY

The present invention relates to the field of image forming technology and, more particularly, to an image forming apparatus and system capable of sending an alert message when the image forming apparatus is connected to a specific network.

BACKGROUND OF THE DISCLOSURE

As the imaging technology matures, image forming apparatus, as a kind of computer peripheral equipment, has been gradually popularized in the office and home environment because of its advantages of fast speed and low cost for single-page imaging, etc. According to different functions, the image forming apparatus includes printers, copiers, multifunction machine, and the like. According to imaging principles, the image forming apparatus includes laser printers, ink jet printers, dot matrix printers, and the like.

With the wide-spread use of the Internet technology, in order to make it more convenient for users to use image forming apparatus, image forming apparatus with network functions are gradually popularized, that is, image forming apparatus that needs to be configured with network interfaces. Under existing technology, following two ways are provided: (1) the image forming apparatus itself contains a network server, and the network server has a network interface, which only requires plugging in the network cable and being assigned an IP address; (2) the image forming apparatus uses an external network server, the image forming apparatus is connected to the network server through a parallel port or a USB port, and the network server is then connected to the network.

The image forming apparatus with network function generally has management and monitoring software. Through the management software, a user can remotely view and intervene the work tasks of the image forming apparatus and set the configuration parameters of the image forming apparatus. Most of the network printing management software is Web-based. Through the monitoring software, a user can view the print job, the operation status of the image forming apparatus and other information. Therefore, the operation of the image forming apparatus with network function is very simple and quick.

According to the present disclosure, with existing technology, although the image forming apparatus can manage and view the operation of the image forming apparatus through the management and monitoring software, how to ensure the security of document transmission of the image forming apparatus is a problem to be solved. Especially, when the image forming apparatus is connected to a specific network, the user often cannot know such connection in time. Thus, if an unauthorized user connects to a network-enabled image forming apparatus through a specific network, it is likely that the real user does not know, which poses a potential threat to the security of network-enabled image forming apparatus.

The disclosed method and apparatus are directed to solve one or more problems set forth above and other problems.

SUMMARY

The present invention provides an image forming apparatus and system capable of sending an alert message to a user when the image forming apparatus is connected to a specific network, in order to solve the technical problem in the related art that the user cannot know in real-time when the image forming apparatus is connected to a specific network.

According to one aspect of the present disclosure, an image forming device is provided. The image forming device includes a network port for accessing a specific network through a network server; and a network monitoring device. The network monitoring device includes: a data acquirer configured to connect with the network port and to output network data of the network port; a data analyzer connected with the data acquirer and configured to analyze the network data to determine whether the network data transmitted from the data acquirer contains information indicating that the image forming device is connected to the specific network; and an alert message transmitter connected with the data analyzer and configured to, when the data analyzer determines that the network data contains information indicating that the image forming device is connected to the specific network, send an alert message to a user of the image forming device.

According to another aspect of the present disclosure, a network monitoring method for an image forming device is provided. The image forming device includes a network port for accessing a specific network through a network server and a network monitoring device. The method includes: acquiring network data from the network port of the image forming device; analyzing the network data to determine whether the network data contains information indicating that the image forming device is connected to the specific network; and when it is determined that the network data contains information indicating that the image forming device is connected to the specific network, sending an alert message to a user of the image forming device. Further, the process of analyzing the network data to determine whether the network data contains information indicating that the image forming device is connected to the specific network further includes: sending an access request to the network server; and based on one or both of content of a response to the access request response and whether the response to the access request is received within a predetermined time period, determining whether the image forming device is connected to the specific network.

According to another aspect of the present disclosure, an image forming system is provided. The image forming system includes: an image forming device; and a network server capable of allowing the image forming device to access a specific network. The image forming device includes: a network port for accessing the specific network through the network server; and a network monitoring device. The network monitoring device includes: a data acquirer configured to connect with the network port and to output network data of the network port; a data analyzer connected with the data acquirer and configured to analyze the network data to determine whether the network data transmitted from the data acquirer contains information indicating that the image forming device is connected to the specific network; and an alert message transmitter connected with the data analyzer and configured to, when the data analyzer determines that the network data contains information indicating that the image forming device is connected to the specific network, send an alert message to a user of the image forming device.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present invention more clearly, the following briefly introduces the accompanying drawings used for describing the disclosed embodiments. Apparently, the accompanying drawings in the following description show merely some embodiments of the present invention, and a person of ordinary skill in the technology may derive other drawings from these accompanying drawings without creative efforts.

DETAILED DESCRIPTION

The following describes exemplary embodiments in detail, and examples of the embodiments are shown in the accompanying drawings, so as to understand and implement the technical solutions to the technical problems in the present disclosure. Unless otherwise specified, a same number in different drawings may represent a same or similar element. The implementations described in the exemplary embodiments below do not represent all implementations consistent with the present disclosure. On the contrary, the implementations below are merely examples of the apparatus and the methods that are consistent with some aspects of the present disclosure, and should not be used for limiting the present disclosure. Further, as long as there is no conflict, the embodiments of the present invention and features of the embodiments may be combined with each other. For example, in some embodiments, the network server is provided inside the image forming device or apparatus, but the network server may be placed outside of the image forming device. In some embodiments, the manner of notifying the user is mail. However, the short message and the audible warning light in other embodiments can also be applicable to the embodiments. The technical solutions formed by the combination of the various features in the different embodiments are all within the protection scope of the present invention.

Figure 1:
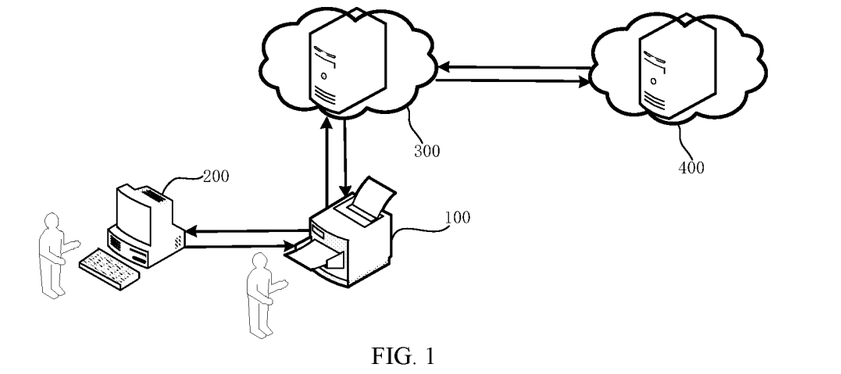
FIG. 1 illustrates a block diagram of an image forming system according to an embodiment of the present invention.

As shown in FIG. 1, the present embodiment provides an image forming system, including an image forming device 100, a computer 200 connected to the image forming device 100, a network server 300 connected to the image forming device 100, and a mail server 400 connected to the network server 300.

Although not shown in FIG. 1, the image forming device 100 may include a paper cassette, an image forming unit, and a network port. The paper cassette is used to accommodate paper sheets of various sizes (for example, A4, B5, Letter) and types (for example, plain paper, photo paper, coated paper). The image forming unit is provided to form images based on any one of a laser imaging principle, an inkjet imaging principle, and a needle imaging principle. The network port is configured to receive job data to be imaged and to send the job data to the image forming unit. The network port may support various network printing protocols, including at least one or more of, but not limited to, RAW, LPD/LPR, IPP, WSD, etc.

Further, the image forming device 100 may be further configured to selectively include one or more of the following units/modules: a USB interface, a Wi-Fi interface, a scanning unit, a facsimile unit, and a display. Other components may also be included.

The USB interface may be used to connect with the external computer 200 and/or network server 300. The Wi-Fi interface may also be used to connect with the external computer 200 and/or network server 300.

The scanning unit may be used to receive a document placed on it by a user, to generate an electronic scanned-document, and to send the scanned electronic document to the imaging forming unit and/or an external computer/document storage server.

The facsimile unit may be used to send documents from the scanning unit or from the external computer/document storage server to other external facsimile equipment, and also to receive facsimile documents from other external facsimile equipment and to send the facsimile documents to the imaging forming unit for printing the facsimile documents.

The display may be provided on the housing of the image forming device 100, and is capable of displaying the current state of the image forming device 100. Further, the operation keys on the housing of the image forming device 100 are capable of cooperating with the display to provide the user with various options and menus for setting the image forming device 100.

The computer 200 may be used to send the job data to the image forming device 100 through the network port. When the image forming device 100 has a USB interface and a Wi-Fi interface, the computer 200 can also transmit the job data to the image forming device 100 via the USB interface and/or the Wi-Fi interface.

The network server 300 may be configured to enable the image forming device 100 to connect to an external network. A network monitoring device of the image forming device 100 may send a request for accessing a specific network to the network server 300 via the network port. The network server 300 accesses a designated website in response to the request. The access process of the network server 300 may comply with international standards of network protocols.

The mail server 400 is configured to, when the image forming device 100 is connected to the specific network, send the network connection information to email addresses preconfigured in the image forming device 100 or the computer 200 by the user. In addition, the sending of the above network connection information through email may also be replaced by an audible alarm or an SMS (short message service) notification, or by a dialog box popped up on the display of the image forming device 100, or a combination of above prompting ways. The specific network may refer to an external network, such as a wide area network, etc. Of course, the user can set specific application scenarios of the specific network according to actual needs.

Figure 2:
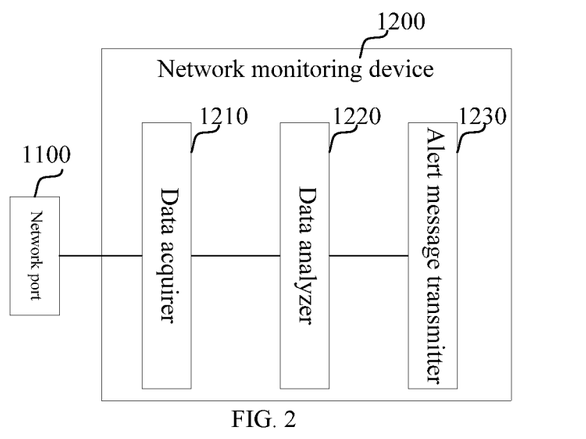
FIG. 2 illustrates a block diagram of a network monitoring device for an image forming device according to an embodiment of the present invention.

As shown in FIG. 2, another embodiment of the present disclosure provides an image forming device having a network monitoring device 1200. The network monitoring device 1200 may include a data acquirer 1210, a data analyzer 1220, and an alert message transmitter 1230.

The data analyzer 1220 is connected with the data acquirer 1210, and is configured to analyze whether the network data obtained by the data acquirer 1210 has information indicating that the image forming device 100 is connected to a specific network.

The alert message transmitter 1230 is connected with the data analyzer 1220 and configured to send an alert message to the user of the image forming device 100 when the data analyzer 1220 detects information indicating that the image forming device 100 is connected to the specific network.

In one embodiment, the network monitoring device 1200 is implemented by an SoC (System on Chip) within the image forming device, e.g., loading corresponding program code by the SoC to implement various functions of the network monitoring device 1200. Of course, there may be a separate network monitoring chip to realize the above functions. The network monitoring chip and the SoC and the network port (network card) in the image forming device can communicate with each other; or some functions/devices/units/modules are implemented by the SoC, and some functions/units/modules are implemented by an independent network chip externally provided outside the SoC.

In one embodiment, the process in which the data analyzer 1220 parses the transmitted network data obtained by the data acquirer 1210 to determine whether the network data includes information indicating that the image forming device is connected to a specific network includes: the network monitoring device sends an access request to a network server and, according to the content of the response to the access request and/or whether the response is received within a predetermined time period, determines whether or not the image forming device is connected to the specific network.

Further, the process in which the data analyzer 1220 parses the transmitted network data obtained by the data acquirer 1210 to determine whether the network data includes information indicating that the image forming device is connected to a specific network also includes: determining whether the content of the response to the access request includes information indicating that the image forming device is connected a specified network address and, when it is determined that the content contains the information indicating that the image forming device is connected to the specified network address, determines that the image forming device is connected to the specific network.

More specifically, the determining process includes: (1) the SoC in the image forming device sends an access request to the network server through the network port (or a network card) (the content of the access request includes a domain name or address of the network server, for example, when the network server is a server of a portal web site, the content of the request includes the network address of the portal website); (2) the server sends a response to the access request; (3) according to the content of the response and/or a timeout determination (whether a response is received from the server within a predetermined period of time), whether the image forming device is connected to the specific network can be determined. Optionally, both the data acquirer 1210 and the data analyzer 1220 use CURL (an open source file transfer tool working in the command line mode with URL syntax) to accomplish data acquisition, data parsing, and return of access status.

The server may be a server of a portal website or an image forming device user's own server. If the server is the user's own server, the server may also act like a portal server provided on a public network (a specific network), at which time the user's own server acts as a portal website. During the interaction process between the image forming device and the network server, the interaction data may be encrypted to increase the security of the image forming device and the network server.

Because it only needs to determine whether a specific network can be connected to, any website (for example: www.baidu.com) can be visited to see if the website can be successfully accessed and the information obtained from the website can be used to determine whether the image forming device can be connected to that specific network. In one embodiment, in order to more accurately determine the validity of the data and to prevent interference, the image forming device may be configured in such a way to only be able to access the designated website(s) fixed inside the image forming device, and such setting (e.g., network addresses of accessible network(s), website(s), or server(s)) cannot be modified by the user. Of course, as an alternative technical solution, the network address of the designated website may be set in the bottom-layer firmware code of the image forming device or may be set by the user through the upper application layer connected to the network monitoring device.

In one embodiment of the present invention, the format of the alert message includes at least one of an email notification, an audible alarm, an SMS message notification, and a pop-up dialog box on the display of the image forming device, etc.

In addition, the present embodiment also provides an image forming system including an image forming device 100 in which a network port 1100, a network server 300 capable of allowing the image forming device 100 to access a specific network, and a network monitoring device 1200 provided by the embodiment.

Figure 3:
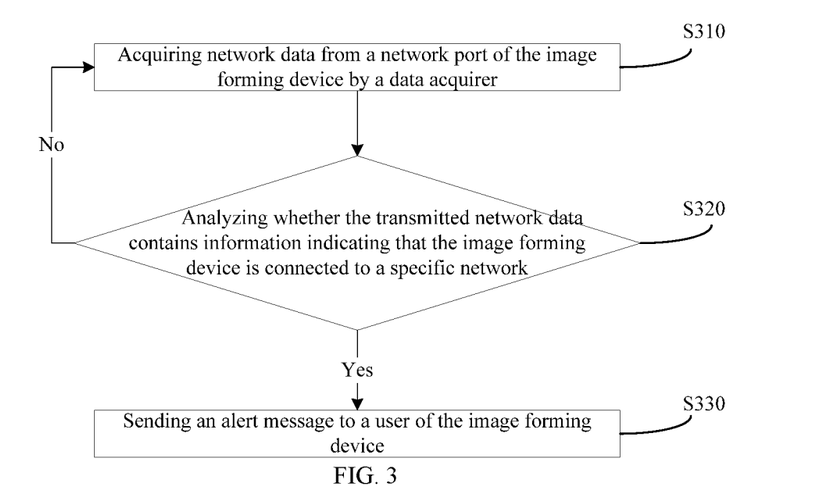
FIG. 3 illustrates a flowchart of a network monitoring method for an image forming device according to an embodiment of the present invention.

As shown in FIG. 3, another embodiment further provides a network monitoring method for an image forming device. The network monitoring method includes the following.

S310: Acquiring network data from a network port of the image forming device by a data acquirer.

S320: Analyzing whether the transmitted network data in the data acquirer contains information indicating that the image forming device is connected to a specific network. The process of determining whether the network data includes information indicating that the image forming device is connected to a specific network includes: determining whether transmitted network data from the network port contains information indicating that the image forming device is connected to the specific network address and, when the network data contains the information indicating that the image forming device is connected to the specific network address, determining that the image forming device is connected to the specific network. If it is determined that the image forming device is connected to the specific network, the method continues at S330; otherwise S310 is performed and the network data is parsed in the next clock cycle and continues to determine in the next cycle whether there is information indicating that the image forming device is connected to the specific network.

S330: Sending an alert message to a user of the image forming device when the data analyzer detects the information indicating that the image forming device is connected to the specific network.

In one embodiment, the network monitoring method described above may be executed by a controller provided in the image forming device, which may be an SoC mentioned above or a chip that independently performs the network monitoring function.

Further, when determining whether the transmitted network data has the information indicating that the image forming device is connected to the specific network, the controller may perform certain actions including: sending an access request and, according to the content of the response to the access request and/or whether the response is received within a predetermined time period, determining whether or not the image forming device is connected to the specific network.

Accordingly, the disclosed system and method may include certain technical advantages, such as: (1) for an image forming device with network function, when the image forming device is connected to a specific network, such information is presented to the user, such that the user is informed in time of the state of the image forming device. Thus, when the user does not want the image forming device to be connected to the specific network, the user can promptly turn off the network communication switch of the network port in the image forming device to avoid unnecessary security risk. (2) by determining whether the network data transmitted through the network port contains information indicating that the image forming device is connected to the specific network address, it can be determined accurately and quickly whether the image forming device is connected to a specific network.

In another embodiment, further, an additional function may be added, such as automatically disconnecting the network switch without receiving confirmation information from the user within a predetermined time period; changing the network server from being externally provided to being internally placed; and changing the alerting method from alerting by the mail server to the SMS alert messages, while the methods, systems, devices, units, components and the like may remain the same, description of which is not repeated herein.

Figure 4:
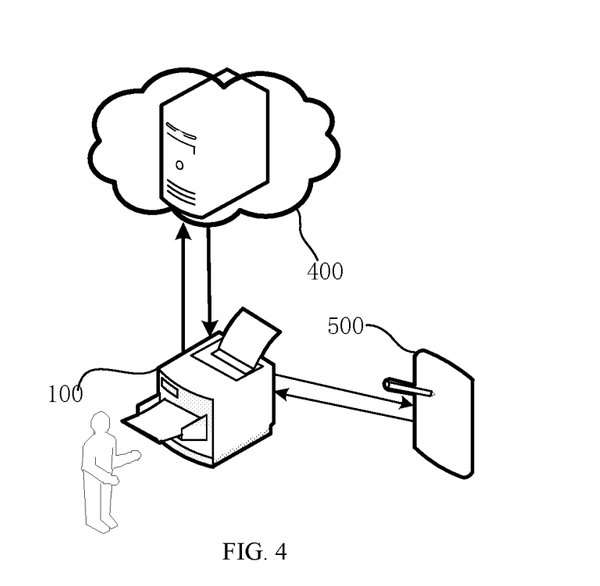
FIG. 4 illustrates a block diagram of an image forming system according to another embodiment of the present invention.

As shown in FIG. 4, in one embodiment, an image forming system is provided, including an image forming device 100 and a computer 200 connected to the image forming device 100. A network server is directly provided inside the image forming device 100. Further, in the image forming device 100, a GSM (Global System for Mobile Communication) chip is internally provided, which is mainly used for sending SMS messages. The image forming system may also include an SMS receiving terminal 500, such as a mobile phone, a pad, etc., connected to the image forming device 100.

Figure 5:
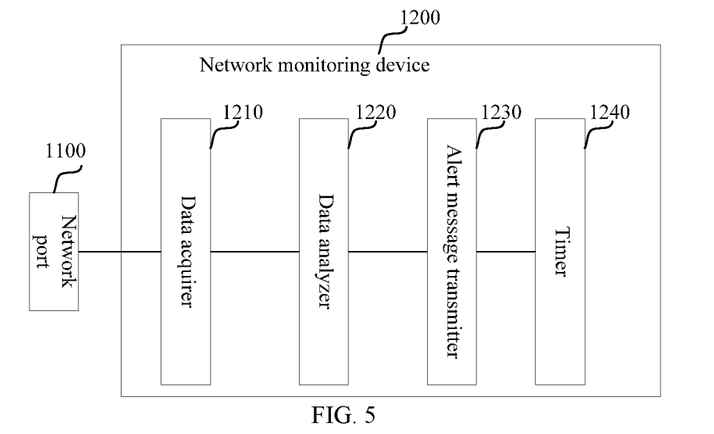
FIG. 5 illustrates a block diagram of a network monitoring device for an image forming device according to another embodiment of the present invention.

As shown in FIG. 5, for the network monitoring device 1200 of the image forming device, in addition to the data acquirer 1210, the data analyzer 1220, and the alert message transmitter 1230, a timer 1240 may also be provided. After the alert message transmitter 1230 sends out the alert message, the timer 1240 starts counting. Thus, when a confirmation signal from the user for allowing the image forming device 100 to be connected to the specific network is not received within a predetermined period of time, the timer 1240 times out and causes the network monitoring device 1200 to automatically disconnect the network communication switch of the network port in the image forming device. For example, the alert message transmitter sends out a message for automatically disconnecting the network communication switch of the network port in the image forming device, or the controller may automatically disconnects the network communication switch of the network port in the image forming device.

Figure 6:
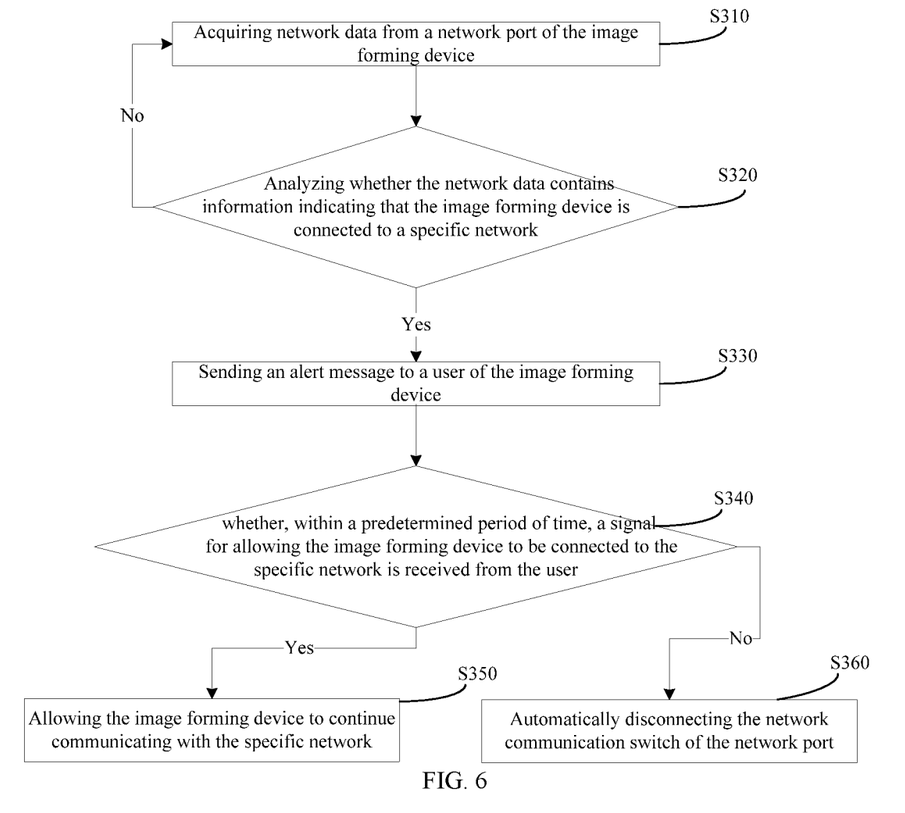
FIG. 6 illustrates a flowchart of a network monitoring method for an image forming device according to another embodiment of the present invention.

As shown in FIG. 6, in another embodiment, a network monitoring method for an image forming device is provided. The method includes the followings.

S310: Acquiring network data from a network port of the image forming device by a data acquirer.

S320: Analyzing whether the transmitted network data in the data acquirer contains information indicating that the image forming device is connected to a specific network.

S330: Sending an alert message to a user of the image forming device when the data analyzer detects the information indicating that the image forming device is connected to the specific network.

S340: Determining whether, within a predetermined period of time, a signal for allowing the image forming device to be connected to the specific network is received from the user. If yes, S350 is performed; otherwise, S360 is performed.

S350: Allowing the image forming device to continue communicating with the specific network.

S360: Automatically disconnecting the network communication switch of the network port in the image forming device.

According to the disclosed network monitoring method, additional advantages may be obtained. For example, after the alert message transmitter sends out the alert message, when a confirmation signal for allowing the image forming device to be connected to the specific network is not received from the user within a predetermined period of time, it may be inferred that the image forming device is likely accessed by an unauthorized user, and the network communication switch of the network port in the image forming device can be directly and automatically disconnected, preventing the image forming device from information leakage. For example, the alert message transmitter sends out a message for automatically disconnecting the network communication switch of the network port in the image forming device, or the controller may automatically disconnect the network communication switch of the network port in the image forming device.

In one embodiment, a process of determining whether there is confidential data in the job data from the network port may also be provided. Specifically, the data analyzer provided in certain embodiments may further analyze the job data transmitted by the network port to determine whether the job data contains a predetermined keyword(s).

If the predetermined keyword is included in the job data, when the data analyzer determines that the network data transmitted in the data acquirer contains information indicating that the image forming device is connected to the specific network, the data analyzer may automatically disconnect the network communication switch of the network port in the image forming device. Thus, it is possible to further prevent the sensitive information file including the keyword from being transmitted to the specific network.

For example, in one embodiment, if the image forming device can be connected to a cloud print server (for example, Google cloud printing, JD cloud printing, etc.) through the network port, when the network monitoring device determines that the document data transmitted to the cloud print server from the image forming device contains a keyword such as "secret", "confidential", or "internal use only", the network monitoring device automatically disconnects the network communication switch. Further, optionally, if an authenticated user overrides the system to force such transmission through the driver software of the image forming device, the network monitoring device or the controller opens the network communication switch to allow such transmission.

Further, a process of preventing the image forming device from leaking information due to being connected to a specific network may also be provided. Specifically, in one embodiment, after the alert message transmitter sends out the alert message, when a user confirmation is not received to allow the image forming device to be connected to the specific network, the alert message transmitter sends out a message for prohibiting the firmware of the image forming device from being upgraded. Thus, an illegal intruder can be prevented from remotely and maliciously controlling the image forming device through the network port of the image forming device.

In one embodiment, after the alert message transmitter sends out the alert message, the alert message transmitter may send out a message for disconnecting the internal network connection or for prompting the user to disconnect the internal network. Based on the message, the computer in the local area network managing the image forming device or a back-end management server may disconnect the internal network connection of the image forming device. Thus, it may prevent an illegal intruder from stealing, through the image forming device, the data in other computers or peripherals in the local area network where the image forming device is located.

Further, corresponding to the above network monitoring method, the controller executing the network monitoring method, after sending out the alert message and before a user confirmation is received to allow the image forming device to be connected to the specific network, can prohibit the firmware of the image forming device from being upgraded.

Further, corresponding to the above network monitoring method, the controller executing the network monitoring method, after sending out the alert message, can disconnect the internal network connection of the image forming device or prompt the user to disconnect the internal network of the image forming device.

Those skilled in art can understand that the disclosed methods may be implemented by computer program instructing relevant hardware, including a processor, and the computer program be stored in a computer-readable storage medium. When the program is executed by the processor, the hardware may perform the above disclosed methods. The storage medium may include various media capable of storing program codes, such as a ROM, a RAM, a magnetic disk, or an optical disc.

Finally, it should be noted that the above description is only some embodiments of the present invention, and is not intended to limit the present invention in any form. A person skilled in the art can make other possible variations of or simple replacements for the technical solution without departing from the invention and the technical contents, which are all within the protection scope of the technical solution of the invention.

What is claimed is:

1. An image forming device, comprising:
a network port for accessing a specific network through a network server; and
a network monitoring device, wherein the network monitoring device includes:
a data acquirer configured to connect with the network port and to output network data of the network port, wherein a network communication switch of the network port in the image forming device is configured to be off in response to a user's request;
a data analyzer connected with the data acquirer and configured to analyze the network data to determine whether the network data transmitted from the data acquirer contains information indicating that the image forming device is connected to the specific network, wherein to analyze the network data to determine whether the network data transmitted from the data acquirer contains information indicating that the image forming device is connected to the specific network, the data analyzer is configured to:
send an access request for accessing the specific network to the network server through the network port, the network server accessing a designated website in response to the access request for accessing the specific network, the access request including a domain name or an address of the network server, and the network server sending a response to the access request, wherein when the network server is a server of a portal web site, the content of the request includes the network address of the portal website; and
based on one or both of content of the response from the network server to the access request response and whether the response to the access request is received within a predetermined time period, determine whether the image forming device is connected to the specific network; and
an alert message transmitter connected with the data analyzer and configured to, when the data analyzer determines that the network data contains information indicating that the image forming device is connected to the specific network, send an alert message to a user of the image forming device, wherein the network communication switch of the network port in the image forming device is configured to be off in response to no confirmation signal being received from the user.

2. The image forming device according to claim 1, wherein the data analyzer is further configured to: determine whether the content of the response to the access request contains information indicating that the image forming device is connected to a designated network address; and when the information indicating that the image forming device is connected to the designated network address, determine that the image forming device is connected to the specific network.

3. The image forming device according to claim 1, wherein the alert message comprises at least one of a mail notification, an audible alarm, a short message notification, and a pop-up dialog box on a display of the image forming device.

4. The image forming device according to claim 1, further comprising a timer, wherein:
after the alert message transmitter sends the alert message, the timer starts counting; and
when a confirmation signal from the user for allowing the image forming device to be connected to the specific network is not received within a predetermined period of time, the timer times out and the alert message transmitter sends out a message for automatically disconnecting the network communication switch of the network port in the image forming device.

5. The image forming device according to claim 1, wherein:
the data analyzer is further configured to analyze job data transmitted by the network port to determine whether the job data contains a predetermined keyword; and
when the predetermined keyword is included in the job data, and when the data analyzer determines that the network data contains the information indicating that the image forming device is connected to the specific network, the alert message transmitter sends out a message for automatically disconnecting the network communication switch of the network port in the image forming device.

6. The image forming device according to claim 1, wherein the alert message transmitter is further configured to:
after sending the alert message, when a confirmation signal from the user for allowing the image forming device to be connected to the specific network is not received within a predetermined period of time, send out a message for prohibiting firmware of the image forming device upgrade from being upgraded.

7. The image forming device according to claim 1, wherein the alert message transmitter is further configured to:
after sending the alert message, sends out a message for disconnecting an internal network connection or prompting the user to disconnect the internal network connection.

8. A network monitoring method for an image forming device including a network port for accessing a specific network through a network server and a network monitoring device, the method comprising:
acquiring network data from the network port of the image forming device, wherein a network communication switch of the network port in the image forming device is configured to be off in response to a user's request;
analyzing the network data to determine whether the network data contains information indicating that the image forming device is connected to the specific network; and
when it is determined that the network data contains information indicating that the image forming device is connected to the specific network, sending an alert message to a user of the image forming device,
wherein analyzing the network data to determine whether the network data contains information indicating that the image forming device is connected to the specific network further includes:
sending an access request for accessing the specific network to the network server through the network port, the network server accessing a designated website in response to the access request for accessing the specific network, the access request including a domain name or an address of the network server, and the network server sending a response to the access request, wherein when the network server is a server of a portal web site, the content of the request includes the network address of the portal website; and
based on one or both of content of the response to the access request response and whether the response to the access request is received within a predetermined time period, determining whether the image forming device is connected to the specific network, wherein the network communication switch of the network port in the image forming device is configured to be off in response to no confirmation signal being received from the user.

9. The method according to claim 8, wherein analyzing the network data to determine whether the network data contains information indicating that the image forming device is connected to the specific network further includes:
determining whether the content of the response to the access request contains information indicating that the image forming device is connected to a designated network address; and
when the information indicating that the image forming device is connected to the designated network address, determining that the image forming device is connected to the specific network.

10. The method according to claim 8, wherein the alert message comprises at least one of a mail notification, an audible alarm, a short message notification, and a pop-up dialog box on a display of the image forming device.

11. The method according to claim 8, wherein the image forming device includes a timer, and the method further includes:
after sending the alert message, starting the timer for a predetermine counting period; and
when a confirmation signal from the user for allowing the image forming device to be connected to the specific network is not received within the predetermined counting period by the timer, sending out a message for automatically disconnecting the network communication switch of the network port in the image forming device.

12. The method according to claim 8, further including:
analyzing job data transmitted by the network port to determine whether the job data contains a predetermined keyword; and
when the predetermined keyword is included in the job data, and when the network data contains the information indicating that the image forming device is connected to the specific network, sending out a message for automatically disconnecting the network communication switch of the network port in the image forming device.

13. The method according to claim 8, further including:
after sending the alert message, when a confirmation signal from the user for allowing the image forming device to be connected to the specific network is not received within a time period, sending out a message for prohibiting firmware of the image forming device upgrade from being upgraded.

14. The method according to claim 8, further including:
after sending the alert message, sending out a message for disconnecting an internal network connection or prompting the user to disconnect the internal network connection.

15. An image forming system, comprising:
an image forming device; and
a network server capable of allowing the image forming device to access a specific network, wherein the image forming device includes:
a network port for accessing the specific network through the network server; and
a network monitoring device including:
a data acquirer configured to connect with the network port and to output network data of the network port, wherein a network communication switch of the network port in the image forming device is configured to be off in response to a user's request;

a data analyzer connected with the data acquirer and configured to analyze the network data to determine whether the network data transmitted from the data acquirer contains information indicating that the image forming device is connected to the specific network, wherein to analyze the network data to determine whether the network data transmitted from the data acquirer contains information indicating that the image forming device is connected to the specific network, the data analyzer is configured to:

send an access request for accessing the specific network to the network server through the network port, the network server accessing a designated website in response to the access request for accessing the specific network, the access request including a domain name or an address of the network server, and the network server sending a response to the access request, wherein when the network server is a server of a portal web site, the content of the request includes the network address of the portal website; and based on one or both of content of the response from the network server to the access request response and whether the response to the access request is received within a predetermined time period, determine whether the image forming device is connected to the specific network; and an alert message transmitter connected with the data analyzer and configured to, when the data analyzer determines that the network data contains information indicating that the image forming device is connected to the specific network, send an alert message to a user of the image forming device, wherein the network communication switch of the network port in the image forming device is configured to be off in response to no confirmation signal being received from the user.

16. The image forming system according to claim 15, wherein the data analyzer is further configured to: determine whether the content of the response to the access request contains information indicating that the image forming device is connected to a designated network address; and when the information indicating that the image forming device is connected to the designated network address, determine that the image forming device is connected to the specific network.

\* \* \* \* \*